United States Patent [19]
Nash

[11] Patent Number: 5,987,810
[45] Date of Patent: Nov. 23, 1999

[54] INSECT TRAP

[76] Inventor: Troy L. Nash, 3253 Washington Rd., #3, East Point, Ga. 30344

[21] Appl. No.: 09/167,784

[22] Filed: Oct. 7, 1998

Related U.S. Application Data

[60] Provisional application No. 60/061,300, Oct. 7, 1997.

[51] Int. Cl.$^6$ .................................................. A01M 1/20
[52] U.S. Cl. ................................. 43/107; 43/118; 43/119
[58] Field of Search ..................... 43/124, 131, 132.1, 43/107, 118, 119

[56] References Cited

U.S. PATENT DOCUMENTS

| | | |
|---|---|---|
| 1,056,535 | 3/1913 | Grimes . |
| 1,184,486 | 5/1916 | Myers . |
| 4,098,977 | 7/1978 | Foster ........................................ 43/107 |
| 4,310,985 | 1/1982 | Foster ........................................ 43/131 |
| 4,856,226 | 8/1989 | Taylor . |
| 4,908,978 | 3/1990 | Zacharias . |
| 5,241,779 | 9/1993 | Lee . |
| 5,323,556 | 6/1994 | Carle ........................................ 43/139 |

FOREIGN PATENT DOCUMENTS

| | | | |
|---|---|---|---|
| 2687287 | 8/1993 | France ..................................... | 43/107 |

OTHER PUBLICATIONS

Article published in the Sunday Star on Jun. 21, 1959 titled "Bothered by Flies? Try Using Noose".

Article published in Popular Mechanics, p. 99, May 1943. Article is directed to spraying a screen containing flies with an insecticide.

*Primary Examiner*—Jack W. Lavinder
*Attorney, Agent, or Firm*—Kenneth L Tolar

[57] ABSTRACT

An insect trap includes a substantially cylindrical, hollow base component having an open top in communication with an interior chamber and a chemical attractant device received therein. Superimposed on the open top is a mesh screen that is precoated with an insect eradicating substance. A plurality of legs extend from the bottom surface of the base component for supporting the base component a predetermined distance above a supporting surface. In addition, the interior chamber may be selectively enclosed with a transparent, semi-spherical lid member whenever the device is not in use. The chemical attractant is released to the surrounding environment to attract insects to the insecticide coated mesh screen where they are eradicated.

5 Claims, 2 Drawing Sheets

INSECT TRAP

This application is entitled to, and the inventor hereby claims, the benefit of the filing date of Provisional Application Number 60/061,300 filed on Oct. 7, 1997.

BACKGROUND OF THE INVENTION

The present invention relates to a new and improved insect trap to attract and kill pests such as mosquitoes and flies. More specifically, the device comprises a cylindrical, hollow housing having a chemical insect attractant received therein. A screen overlays the open top of the housing just above the chemical attractant and is coated with an insecticide. The attractant lures insects to the housing whereby the insect is killed upon contacting the screen.

DESCRIPTION OF THE PRIOR ART

For many years, insects such as roaches, flies, wasps and mosquitoes have plagued campsites, backyards, picnic areas and other outdoor facilities. Numerous devices have been heretofore designed to address the problem such as various insect traps, poisons and electrocution assemblies. Some of these devices use vacuums or fans to draw the insects into an enclosure. Others use a heat source, an incandescent light or other means for attracting the insects to the trap so that an electrical current can stun or kill them.

For example, a vacuum like trap is disclosed in U.S. Pat. No. 5,323,556 issued to Carle. The device comprises a substantially rectangular box having a fan mounted therein for forcing air out of the box thereby reducing the pressure therein. The device also has a light mounted within a conical shaped opening which attracts an insect thereto so that the fan will pull the insect inside the box.

U.S. Pat. No. 5,241,779 issued to Lee relates to an apparatus for collecting and killing insects comprising a housing with a heater disposed therein for attracting insects to the housing. The housing also contains a power source for stunning or killing the insects at which time the insects are vacuumed into a collection vessel for later disposal.

U.S. Pat. No. 4,908,978 issued to Zacharias relates to an insect destroyer comprising a casing with a fan mounted therein for drawing insects. Also mounted within the casing and proximal the fan are a pair of electrically connected mesh screens. When the fan is in operation, the insects are drawn to the screens and destroyed.

U.S. Pat. No. 4,856,226 issued to Taylor discloses an insect eradication device which utilizes an incandescent light source to lure insects into a zone proximal the apparatus enclosure. A suction fan creates a vacuum within the enclosure drawing insects therein where they are eradicated using closely spaced fan blades. The resulting debris is deposited in a removable collection chamber.

As indicated above, many of the insect traps or eradication devices in the prior art require fans, heat sources, incandescent lights, and similar, electrically operated equipment. The present invention relates to a simpler and less expensive insect trap that can attract and kill insects without using lights, vacuum sources or other electrical sources. Accordingly, the device can be used in remote outdoor areas where electricity is unavailable. Furthermore, the device is lightweight and may be easily transported from one location to another. Finally, when the device is not in use, the internal attractant and insecticide may be enclosed with a decorative cap so as to conserve the useful life thereof.

SUMMARY OF THE INVENTION

The present invention relates to a lightweight apparatus for attracting, killing and collecting insects. The device comprises a hollow, substantially cylindrical base component having a plurality of legs extending from its bottom end and an open top in communication with an interior chamber. Received within the interior chamber is a container which emits a chemical attractant to lure an insect near the base component. Overlaying the open top of the housing are one or more screens precoated with an insecticide. The open top of the housing and the interior chamber are selectively enclosable with a transparent, semi-spherical lid when the device is not in use. The chemical attractant lures nearby insects to the base component where it contacts the insecticide laced screen and dies. The insect will then fall to the bottom of the base component for later disposal. It is therefore an object of the present invention to provide an insect trap which does not require electrical attractants or eradication devices.

It is yet another object of the present invention to provide an insect trap which is simple and inexpensive to manufacture and easy to use.

It is yet another object of the present invention to provide an insect trap capable of emitting a pleasant odor to the surrounding area.

It is yet another object of the present invention to provide an insect trap having a removable cover to enclose the device when not in use.

Other objects, features and advantages of the present invention will become readily apparent from the following detailed description of the preferred embodiment when considered with the attached drawings and the appended claims.

DESCRIPTION OF THE PREFERRED EMBODIMENT

Figure 2:
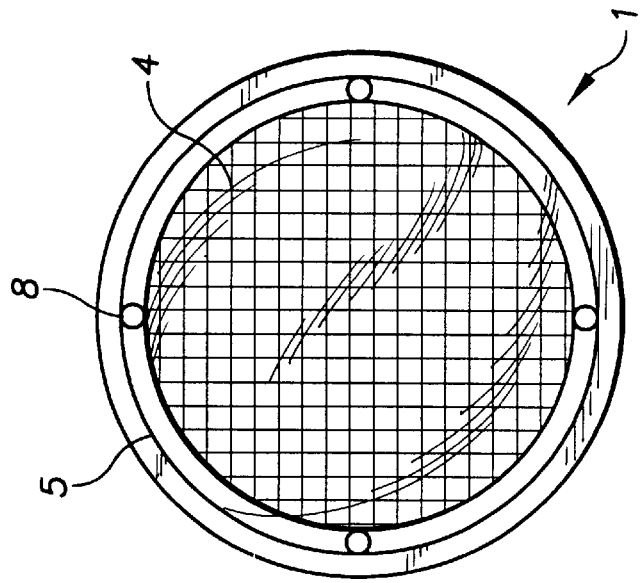
FIG. 2 is a top view of the inventive device depicting a screen overlaying the open top of the housing.
Figure 1:
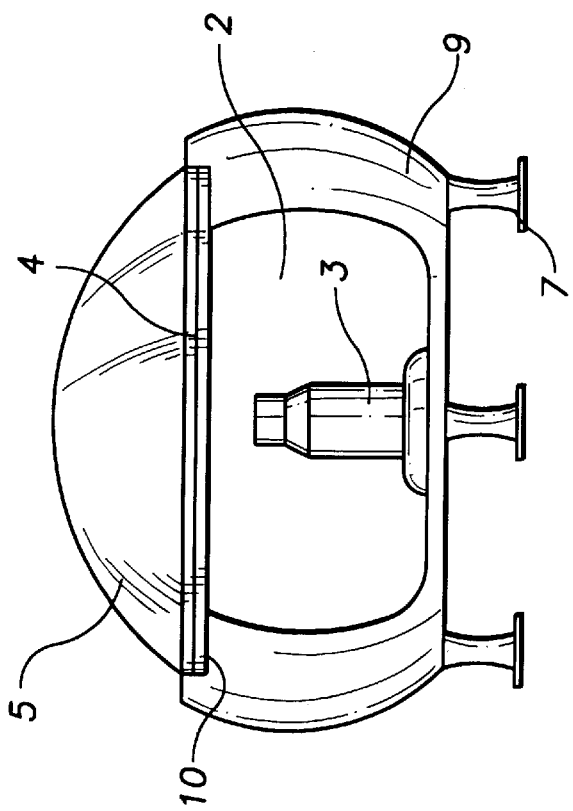
FIG. 1 is a cross-sectional view of the device showing the chemical attractant container received therein.
Figure 4:
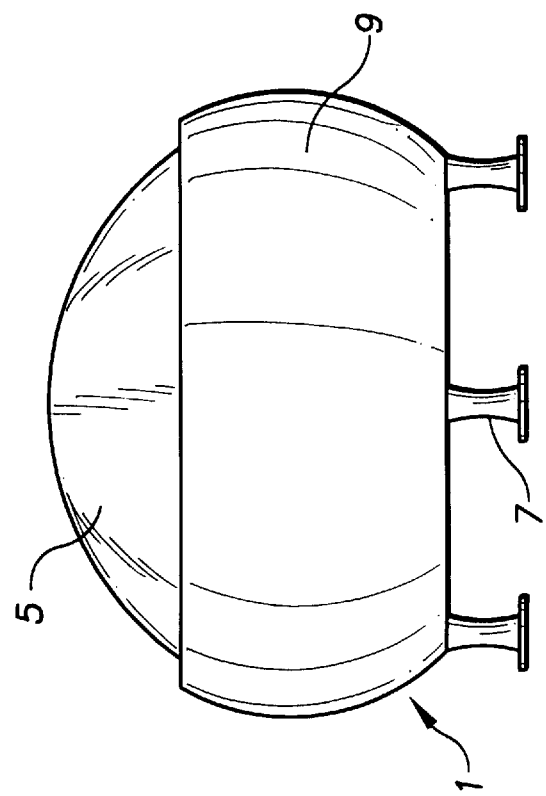
FIG. 4 is a side view of the inventive device.
Figure 3:
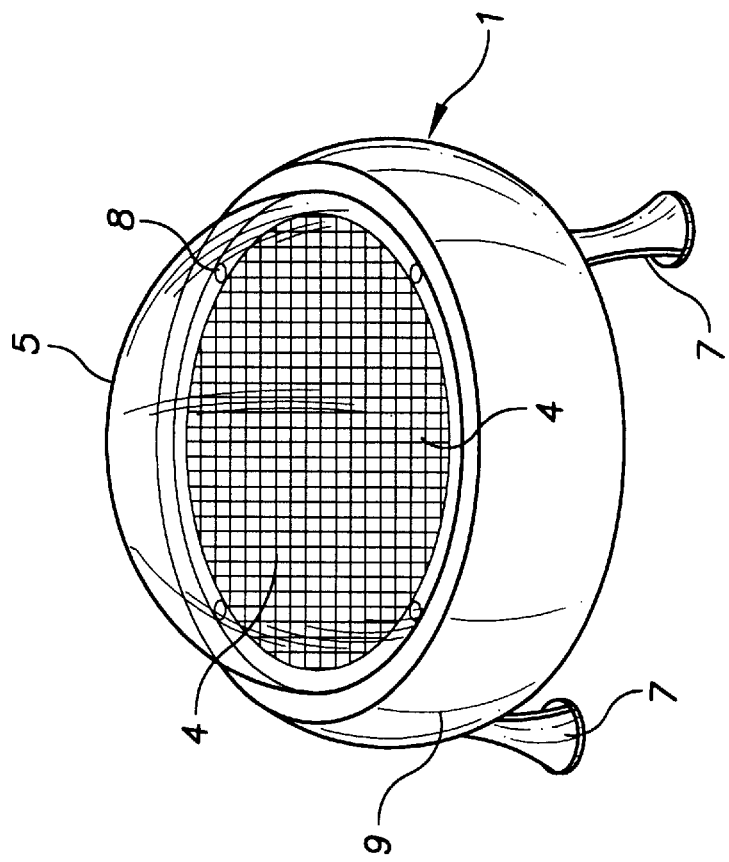
FIG. 3 is a perspective view of the inventive device showing the transparent plastic lid resting thereon.

Referring now to FIGS. 1 through 4, the present invention relates to a portable, lightweight insect trap. The device comprises a substantially cylindrical hollow base component 1 having a continuous outer wall 9, a closed bottom surface and an open top in communication with an interior chamber 2. Preferably, the outer wall 9 of the base component has a slightly arcuate, convex configuration as is apparent in FIG. 4.

Received within the interior chamber is a chemical attractant container 3 which emits an insect attractant to lure nearby insects to the base component. Preferably, the attractant also includes a substance having a pleasant odor so that the device simultaneously serves as an air freshener and insect trap. Extending from the bottom surface of the housing are a plurality of legs 7 for supporting the base component a predetermined distance above a supporting surface such as a table top or similar item.

Overlaying the open top of the base component is one or more mesh screens 4 which have been pre-coated with a conventional poisonous insecticide. Alternatively, the screens may be coated with other conventional materials that kill an insect upon contact, aspiration or consumption thereby. Preferably, the top end of the housing includes a recessed ledge 10 on which the peripheral edge of the screen rests whereby the screens may be easily removed and replaced. Additionally, the peripheral edge of the screen may include a plurality of apertures 8 for receiving a fastener means, such as screws or bolts, to further secure the screen to the ledge.

The device also comprises a removably attached, transparent semi-spherical lid 5 which encloses the interior chamber and the contents therein whenever the device is not in use to extend and preserve the useful life of the attractant and insecticide. Furthermore, the lid may prevent children or pets from contacting the screens. In addition, the transparent, uniquely shaped lid in combination with the convex outer wall of the base component provides an insect trap having a novel, aesthetically pleasing appearance. Preferably, the lid includes a circular free edge that fits within a groove on the ledge 10 to removably secure the lid to the base component. However, other conventional attachment means may also be used.

To use the above described device, a user removes the transparent lid allowing the chemical attractant to be gradually released into the surrounding atmosphere. Nearby insects are attracted to the base component and are killed upon the insects contacting or closely approaching the screens. The dead insects then fall to the bottom of the base component interior chamber where they are collected for eventual disposal. The mesh screens, the chemical attractant container and/or the insecticide may be replaced as needed.

The insect attractant and insecticide are conventional materials and, therefore, additional description is unnecessary. The base component and semi-spherical lid are preferably manufactured with plastic or a similar lightweight equivalent while the screens may be manufactured with steel, stainless steel, plastic or any other suitable material. However, as will be readily apparent to those skilled in the art, the size, shape and materials of construction may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An insect trap comprising:

a hollow base component having a bottom end and an open top in communication with an interior chamber;

a container received within said interior chamber, said container containing and emitting a chemical insect attractant to lure insects to the base component;

a mesh screen member overlaying and superimposed on the open top of the base component, said screen precoated with an insect eradicating substance for destroying insects proximal thereto.

2. A device according to claim 1 further comprising a plurality of support legs extending from the bottom end of said base component for supporting the base component a predetermined distance above a supporting surface.

3. A device according to claim 1 further comprising a transparent lid member removably secured to the base component and overlaying the open top to selectively enclose the screen member and said container and to prevent tampering therewith.

4. A device according to claim 3 wherein said lid member is semi-spherical providing a novel aesthetically pleasing appearance to the base component when the lid is secured thereto.

5. A device according to claim 1 wherein said base component is substantially cylindrical having a convex, arcuate outer wall.

* * * * *